(12) United States Patent
Hall

(10) Patent No.: US 8,736,827 B2
(45) Date of Patent: May 27, 2014

(54) METHOD AND SYSTEM FOR MEASURING THE PROPAGATION PROPERTIES OF A LIGHT BEAM

(75) Inventor: Simon Richard Geoffrey Hall, Middlesex (GB)

(73) Assignee: The Secretary of State for Business Innovation and Skills of Her Majesty's Brittannic Government, London (GB)

( * ) Notice: Subject to any disclaimer, the term of this patent is extended or adjusted under 35 U.S.C. 154(b) by 45 days.

(21) Appl. No.: 13/265,310

(22) PCT Filed: Apr. 28, 2010

(86) PCT No.: PCT/GB2010/000848
§ 371 (c)(1),
(2), (4) Date: Dec. 13, 2011

(87) PCT Pub. No.: WO2010/125344
PCT Pub. Date: Nov. 4, 2010

(65) Prior Publication Data
US 2012/0086936 A1    Apr. 12, 2012

(30) Foreign Application Priority Data

Apr. 28, 2009 (GB) .................................. 0907290.1

(51) Int. Cl.
*G01J 1/00* (2006.01)
*G01J 1/42* (2006.01)
*G01M 11/06* (2006.01)

(52) U.S. Cl.
CPC ............ *G01J 1/4257* (2013.01); *G01M 11/061* (2013.01); *G01J 1/42* (2013.01)

USPC ............ 356/121; 356/122; 356/213; 356/218

(58) Field of Classification Search
CPC ............ G01J 1/00; G01J 1/42; G01J 1/4257; G01M 11/061
USPC .................................. 356/122–124, 213–219
See application file for complete search history.

(56) References Cited

U.S. PATENT DOCUMENTS 5,069,527 A * 12/1991 Johnston, Jr. et al. ........ 359/823
6,646,728 B1   11/2003 Tang et al.
(Continued)

FOREIGN PATENT DOCUMENTS

JP      63298019      12/1988
JP      02271314      11/1990
(Continued)

OTHER PUBLICATIONS

Nabeel A. Riza, Mumlaz Sheikh, Grady Webb-Wood, Pieter G. Kik, "Demonstration of three-dimensional optical imaging using a confocal microscope based on a liquid-crystal electronic lens", published in "Optical Engineering" 47(6), 063201 in Jun. 2008 (9 pages).

(Continued)

*Primary Examiner* — Michael P Stafira
(74) *Attorney, Agent, or Firm* — Leason Ellis LLP

(57) ABSTRACT

A system for obtaining a propagation factor for determining the performance of a light beam (32) includes a light sensor (10), a lens element (30) operable to focus a beam from a light source to be tested towards the sensor element (10); wherein the lens element is a variable focus lens (30).

14 Claims, 13 Drawing Sheets

(56) References Cited

U.S. PATENT DOCUMENTS

| | | | |
|---|---|---|---|
| 7,382,545 B2 * | 6/2008 | Jung et al. | 359/666 |
| 7,440,193 B2 * | 10/2008 | Gunasekaran et al. | 359/666 |
| 7,522,345 B2 * | 4/2009 | Oh et al. | 359/665 |

FOREIGN PATENT DOCUMENTS

| | | |
|---|---|---|
| JP | 03265817 | 11/1991 |
| WO | WO 99/18456 | 4/1999 |

OTHER PUBLICATIONS

Carlos Roundy "Propagation factor quantifies laser beam performance", published in "Laser Focus World" in Dec. 1999 (3 pages).

Simon R.G. Hall, David Robinson, Steven D. Knox, Hui Yang, Andrew Scott, Simon Woods, Andrew J. Turner, Andrew Lewin, "Improvement and Commissioning of a Novel Technology for the Measurement of Laser Beam Profiles", downloaded from SPIE Digital Library (vol. 6452, 645208) on Jun. 16, 2010 (12 pages).

Mumtaz Sheikh, Nabeel A. Riza "Motion-free hybrid design laser beam propagation analyzer using a digital micromintor device and a variable focus liquid lens", published in "Applied Optics", vol. 49, No. 16, Jun. 1, 2010 (6 pages).

Simon Hall, Laura Crane, David Gibbs, Brooke Ward, Research Report "Investigation of a measurement technique to determine the apparent source size for light emitting diodes", prepared by National Physical Laboratory and Europtics Ltd for the Health and Safety Executive 2005 (73 pages).

* cited by examiner

METHOD AND SYSTEM FOR MEASURING THE PROPAGATION PROPERTIES OF A LIGHT BEAM

The present invention relates to a method and apparatus for measuring the propagation properties of a light beam, for instance a collimated beam such as a laser beam.

The propagation factor of a beam quantifies the performance of the laser beam. This allows effective prediction of the parameters of an optical system and is becoming increasingly important for various technical and commercial applications which require increasingly precise knowledge of the characteristics of a light beam. For instance, in scientific experiments it is increasingly required to focus the beam to a very high intensity for non-linear processes. In a number of industrial processes, the beam must be focused to the smallest possible spot, for applications such as drilling holes in stainless steel, for medical applications which make use of a laser beam, such as medical procedures in the eye and so on.

Conventional methods for determining the performance of, for instance, a laser beam, have involved a Gaussian fit to the beam profile to evaluate how close that beam is to a pure Gaussian beam. However, it has been shown some time ago that different beams can provide a nearly perfect Gaussian shape but still have different propagation properties. As a result of this, systems and methods which rely upon a Gaussian fit can provide a deceptive and inaccurate indication of the propagation properties of the laser beam, thus giving a false indication of the performance of that laser beam.

As a result of the deficiencies in the Gaussian fit method, there has been developed a beam propagation factor ($M^2$) measurement system which makes use of a lens to determine the dimensions of a beam waist, which provides a much better analysis of the performance of a multi mode laser beam and one which is significantly more reliable and accurate than a method based upon a Gaussian fit. However, it is difficult to make an accurate measurement of the characteristics of a laser beam using the $M^2$ method, which often relies on a trial and error process to determine the correct width of a beam's waist.

As a result of this, the International Organisation for Standardisation (ISO; Geneva, Switzerland) has defined a methodology standard which provides for reliable measurement of $M^2$ so that this parameter can be used with confidence by anyone making the measurement. The method involves placing a lens of a known focal length in a laser beam and then making a series of measurements through the focus waist of the beam. Measurements which are generally considered essential include determining the width of the spot at the smallest focus, position of the spot of that focus, the width of the beam and the focal length of the lens and the divergence of the beam beyond that point of focus. The width of the beam at the focal length of the lens (the waist) may not be at the same place as the smallest spot. Typically, the measurement standard involves taking a series of measurements along different positions of the beam and then performing a curve fit to the measured data to calculate the $M^2$ parameters from that curve fit. The ISO standard specifies certain steps required to obtaining a reliable and consistent measurement of $M^2$. According to this method, the lens must be held stationary and a sensor moved through the waist of the beam, although in some cases it may be easier to hold the sensor stationary and move the lens. Movement of the lens can provide an accurate measurement as long as the input beam is well collimated over the distance in which the lens is moved. If the beam diverges or converges over that length of travel of the lens, the $M^2$ measurement can be incorrect and misleading.

The ISO standard also requires the width of the laser beam to be measured by what is known as the "Second Moment method".

Although this standard and accepted measurement method can provide an accurate indication of the characteristics of a laser beam, the method and associated apparatus have a number of disadvantages. First, the system requires that a series of measurements be taken and then for those measurements to be interpolated, such that in general it is only possible to obtain an estimate of the position of the waist and of its parameters. Furthermore, the system is relatively slow as a result of the need to move the sensor array or lens between measurements and also to ensure that the movement is accurate, reliable and repeatable. This does not provide the ability to determine quickly the performance characteristics of a laser beam, for example. Of course, such systems are also dependent upon the precision of movement of the sensor array or lens.

The present invention seeks to provide an improved method and apparatus for determining the characteristics of a light beam, in particular of a laser beam.

According to an aspect of the present invention, there is provided a system for obtaining a propagation factor for determining the performance of a light beam including a light sensor, a lens element operable to focus a beam from a light source to be tested towards the sensor element; wherein the lens element is a variable focus lens, the lens being operable to be adjusted during operation of the system so as to adjust the focal length thereof to provide to the light sensor a varying focused light beam at and either side of a waist thereof, and thereby to allow the determination of a beam waist and propagation factor of the light beam and therefrom the performance of the light beam.

Such a system does not require movement of the sensor relative to the lens, as specified in the ISO standard, or movement of the lens relative to the sensor. As the lens and sensor can be positionally fixed relative to one another, there is no reliability issue involved with moving these components relative to one another, as in the accepted apparatus, or to provide complex motion mechanisms for moving one of these components of the system.

Advantageously, the variable focus lens element is adjustable by means of an electrical stimulus. This provides a most efficient way of adjusting the characteristics of the lens and therefore its focal distance, by means of a readily producible and reliable electrical stimulus signal.

Such a lens may be an electrowetting liquid lens, for example of the type disclosed in WO-99/18456. Such a lens makes use of two non-miscible liquids held in separate layers within a conducting metal cone or other chamber. The liquid-to-liquid interface of the two non-miscible liquids changes its curvature due to electrowetting, in effect where the relative wettability of the two liquids changes in accordance with the application of a voltage potential across the lens. Typically, the walls are coated with a material which repels one liquid but not the other. This causes the interface of the two liquids to form a curve proximate the centre of the lens. Application of voltage causes the wettability of the conducting liquid to change and thus to deform the liquid-to-liquid interface between the two non-miscible liquids, resulting in a change in the focal length of the lens.

In another embodiment, the lens may be a liquid crystal lens. In yet another embodiment, the lens may be a pressure controlled fluidic lens or an electro-optic variable focus lens.

In one embodiment, the sensor element is a CCD array. However, it is preferred to use a single element detector such as a silicon photodiode, or an InGaAs, pyroelectric or CdTe detector element. The focused beam is directed to the single sensor element by a selection/directing device, which may be a motorised iris or a moveable mirror array, for instance.

According to another aspect of the present invention, there is provided a method of determining the characteristics of a light beam, including the steps of providing a sensor element, providing a variable focus lens element, directing a beam to be quantified at the lens element, during a measuring step varying the focus of the lens element to provide to the sensor element a varying focused light beam at and either side of a waist of the light beam, obtaining therefrom the beam waist and the propagation factor of the light beam and determining from said obtaining step the performance of the light beam.

Embodiments of the present invention are described below, by way of example only, with reference to the accompanying drawings, in which.

The recent proliferation of laser applications has driven a need to characterise the propagation characteristics of laser beams. These characteristics allow effective prediction of optical system parameters, removing the reliance on "trial and error" to accomplish the requisite performance. A number of commercially available beam propagation measurement systems use the accepted methodology described in the ISO 11146 series of standards.

Figure 1:
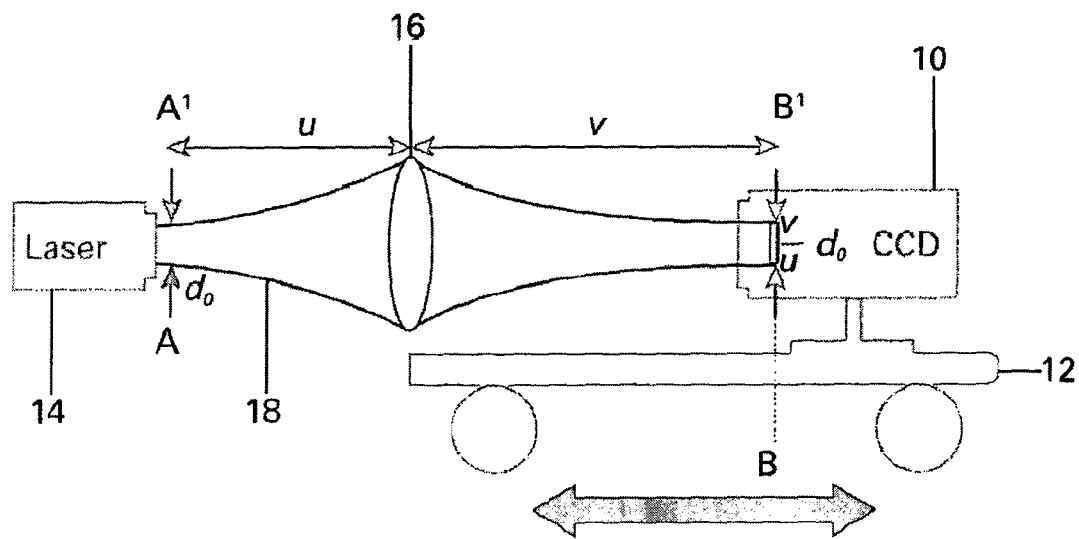
FIG. 1 shows in schematic form an example of apparatus for determining the propagation factor of a laser beam in accordance with ISO standard 11146.

FIG. 1 is a schematic diagram of the measurement method for the determination of the beam propagation ratio and other beam characteristics of lasers. A CCD diode array camera system 10 is placed on a movable carriage 12 in front of a laser source 14. A relay lens 16 of the camera system 10 allows the CCD to capture a spatial intensity profile of the beam 18 at a particular plane. The beam width is then calculated using a modified second moment technique. In order to allow an accurate determination of the beam width it is necessary to ensure that vignetting has not occurred. To address this problem, a self-converging width measurement technique (CSM) can be used to estimate the beam width at each measurement plane and represent the true value to an acceptable level of uncertainty. This measurement is repeated at a number of locations along the test beam axis, as shown schematically in FIG. 2, until enough data points have been obtained to allow the fitting of a hyperbola using a least squares fitting technique or other suitable mathematical technique.

Figure 2:
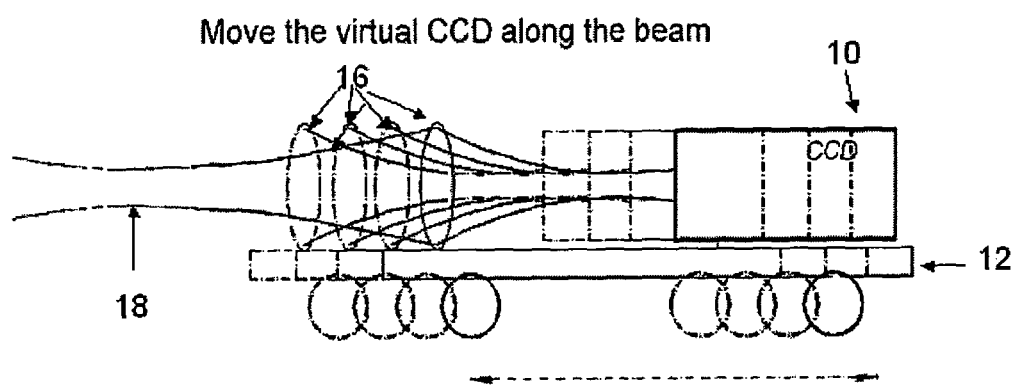
FIG. 2 shows in schematic form the operation of the apparatus of FIG. 1.
Figure 3:
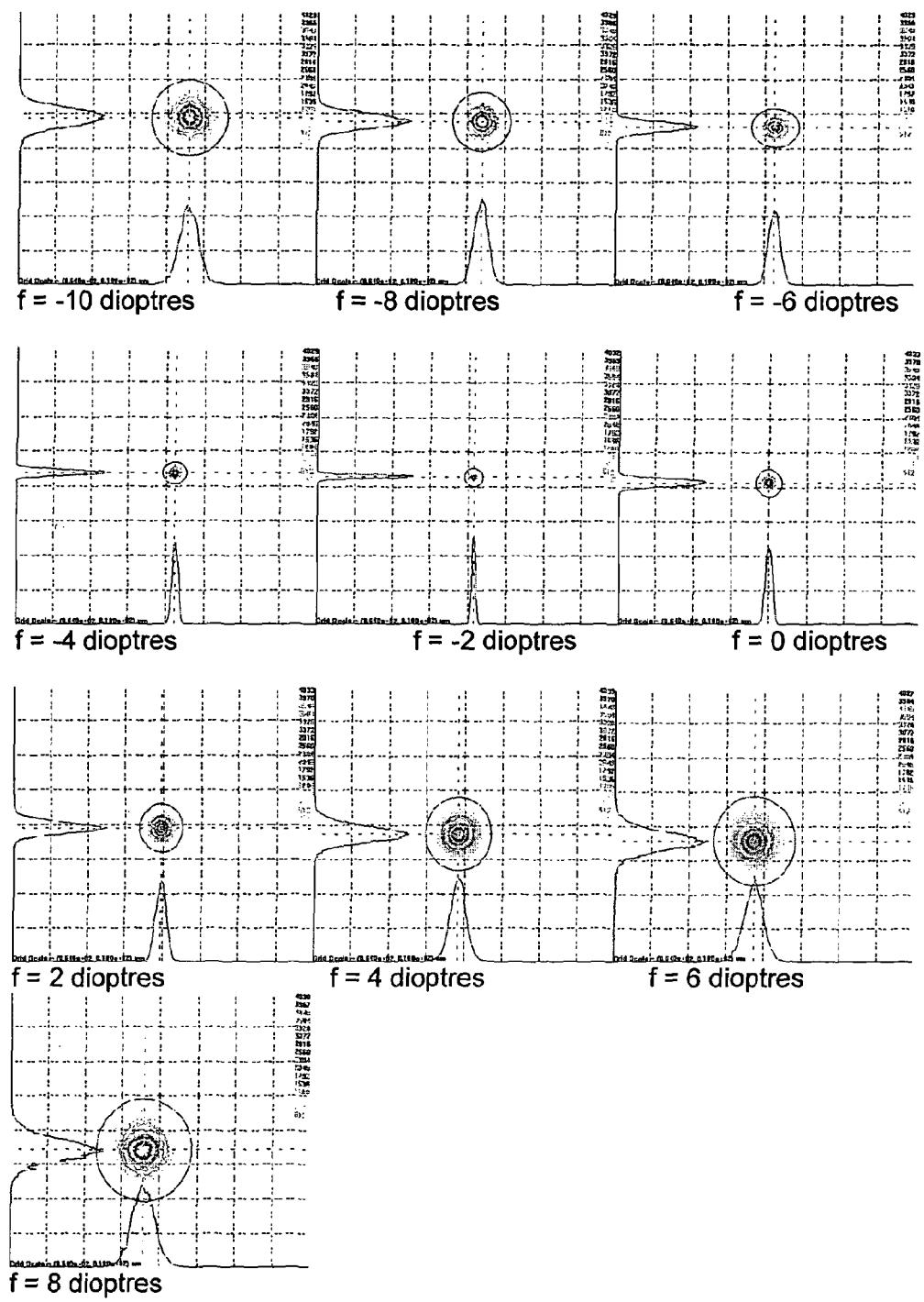
FIG. 3 shows in graphical form a series of example of beam profiles for a laser, with variable lens focus, each image being in dioptres.

In order to obtain the beam width and waist measurement, the focal length of the liquid lens is varied through its optical range, at each position a beam profile measurement is taken. FIG. 2 shows a series of examples of beam profile for a laser, at different dioptres, through the variable lens. The beam width is plotted against the variable focal length of the liquid lens and a hyperbola fit applied to the data points. The coefficients of the fit are extracted. This is shown in the graph of FIG. 3. It will be appreciated that, in dependence on the components used and how these are set up, the electronic and optical components of the system might create an offset in the measurements, which can be accounted for by conventional methods.

A variety of methods can be used to analyse the measured results and determine the characteristics of the beam, including empirical and matrix methods. In an embodiment, the M2 formula used, which preferably is not the ISO 11146 formula used with the coefficients, but is an equivalent to take account of the way in which the device operates having different focal lengths for the different orders. So the ISO 11146 formula of $$M^2 = \frac{\pi}{8\lambda}\sqrt{4ac - b^2}$$

becomes $$M^2 = \frac{\pi}{F_0^2 \lambda}\sqrt{ac - \frac{b^2}{4}}$$

where:
$F_0^2$ is the focal length of the first lens 0.1 m
$\lambda$ is the wavelength of laser
a, c and b are the coefficients from the polynomial fit.

The coefficients of the fitted hyperbola allow the beam propagation parameters of the source to be determined.

If the beam waist is not accessible for direct measurement then a convex lens 16 with minimal aberrations can create an artificial waist. This situation may arise if, for example, the beam waist is formed within the laser 14 or there is insufficient space to perform the required number of measurements either side of the waist. The position and diameter of this artificial waist can then be used, along with the known properties of the transform lens 16, to calculate the location and size of the original beam waist.

Figure 5:
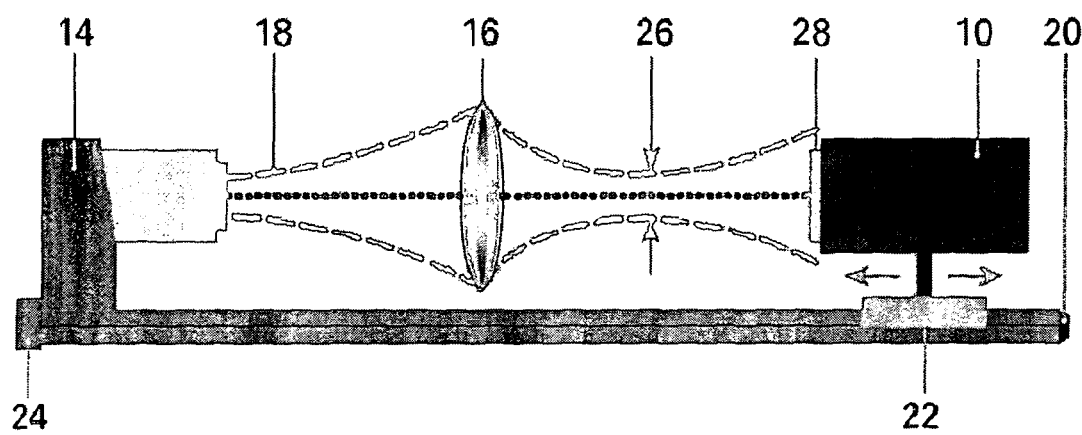
FIG. 5 shows practical implementation of the system of FIG. 1.

Referring now to FIG. 5, there is shown a practical implementation of the system of FIG. 1. The apparatus is provided with a support frame or device 20 upon which a laser source 14 to be tested can be accurately positioned. The sensor device 10 is provided on a moveable carriage 22 which can be moved by means of a stepper motor 24 attached to the framework 20. The stepper motor 24 enables the carriage 22 to move along the framework 20 in the direction of the two arrows shown in FIG. 5. This enables the sensor array to be moved along the light beam 18 in order to detect different parts of that light beam and in particular to seek to identify and measure the artificial beam waist 26 produced by the focusing lens 16. In this embodiment, the camera system 10 is provided with one or more neutral density filters 28 for filtering the light beam 18 prior to the passage of this into the camera unit 10 and thus to the CCD sensor array.

The above system has been the subject of considerable research over the least years, resulting in the evolution of ISO standard 11146 which provides for the measurement of the diameter and divergence of the beam 18. There are a number of methods available for the measurement of the diameter of such a beam, as well as of its far-field divergence. The basic principles of the methods which have been developed are set out in ISO standard 11146. They are applicable to laser beams with a relatively small beam propagation ratio $M^2$. Research has demonstrated that adequate steps have to be taken to counter the effects of noise and offset errors when measuring the transverse irradiance distribution of a beam. When these steps are taken, the propagation behaviour of incoherent broadband beams as well as high quality laser beams can be predicted reproducibly with adequate precision. It will be appreciated that these conventional optical systems utilise relative movement of solid lens elements to change focal characteristics of an optical system, in a manner specified in ISO 11146.

The embodiments of the present invention described below avoid the need of the use of fixed lenses and large motorised movement stages along the direction of light propagation and set the position of the lens or lenses with respect to the sensor device so that the relative positions of these two remain substantially fixed. As a result of this, the apparatus eliminates the need for movement stages and thus considerably reduces the size, complexity and cost of the apparatus. The method also allows simple assessment of the parameters of the system and thus can develop a system which requires less skill and expertise from the operator.

The embodiments described below are particularly useful in the assessment and calibration of high accuracy light systems, particularly laser-based systems for use in industry, biomedicine and research, where the beam propagation parameters of the light beam must be assessed very accurately. These parameters facilitate the optimisation and continuous monitoring required for these applications to ensure maximum yields and high quality products. The parameters are also important in being able to establish the hazard potential of a laser, such as the nominal optical hazard distance and apparent source size for extended beams.

A potential use of such a system is in the measurement of beam parameters of artificial optical sources, for example as is required by the European Artificial Optical Radiation Directive.

The embodiments described below provide a lens and detector which are no longer translated (moved) to obtain different beam diameter measurements at different points along the beam propagation envelope. In stead, a variable focus lens element is used to transform the beam to allow scanning of the beam diameter to determine variations thereof, at enough sampling points so as to provide a high quality derivation of the beam propagation parameters for the light beam. This contrasts with known systems where mechanical means are required to move the lens or detector along the beam direction to acquire beam profile measurements so as to characterise the beam. Providing a variable focus lens element gives the apparatus greater reliability and makes it more simple, as well as reducing the power consumption of the apparatus. Of course, such apparatus represents a deviation from the requirements of ISO 11146 but it has been found can provide a more reliable and a more efficient assessment method.

The embodiments described below provide a number of different examples of beam analysis apparatus which uses a variety of different variable focus lens elements.

Figure 6:
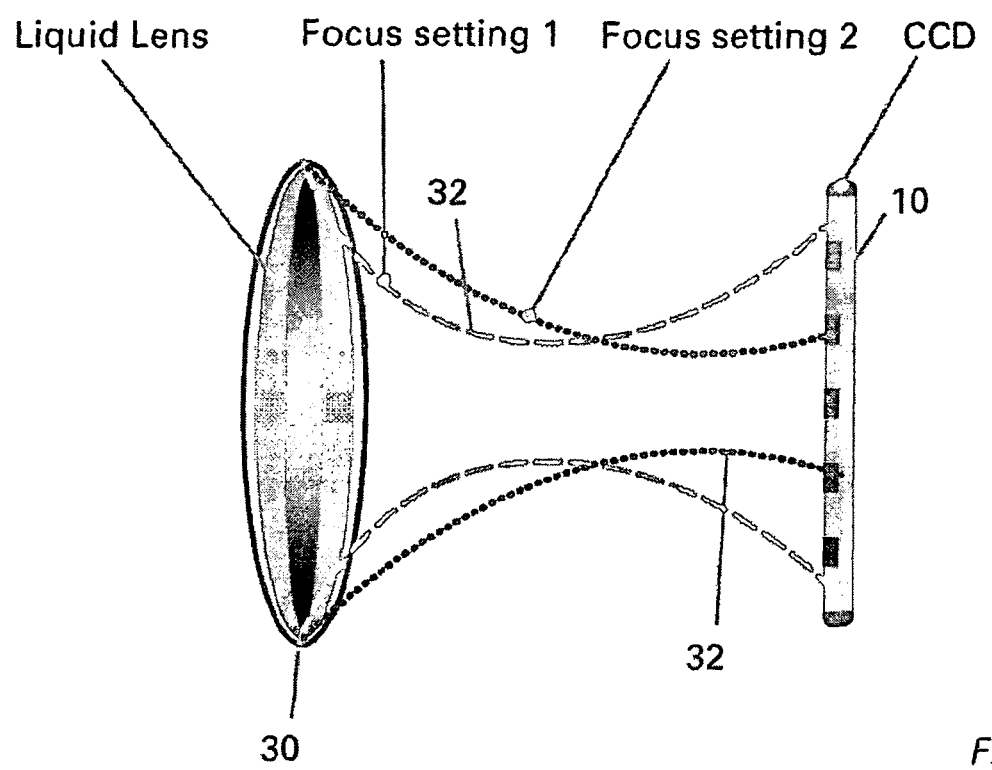
FIG. 6 shows in schematic form an embodiment of apparatus using a variable focus lens in accordance with an embodiment of the invention.

Referring first to FIG. 6, in which there is shown a sensor array 10, which in this example is a conventional CCD sensor array, and a variable focus liquid lens 30. The liquid lens has a structure of the type disclosed in WO-99/18456, for example, and which can be described as an electrowetting liquid lens. The lens 30 is provided with a chamber having located therewithin a conducting metal cone and two immiscible liquids held as separate layers within the chamber. The walls of the cone are coated with a material which repels one of the liquids but not the other. This causes the liquid-to-liquid interface of the two liquids to form a curve towards the centre of the lens, that curvature of which is dependent upon the wettability of the immiscible liquids. When an electrical potential (voltage) is applied across the lens structure, this causes the wettability of the conducting liquid to change and causes deformation of the liquid-to-liquid interface, which results in a change in a curvature of the liquid-to-liquid interface, and thus a change in the focal length of the lens.

Referring to FIG. 6, there are shown in schematic form the outlines of two light beams emanating from the lens 30 as a result in the change in focal length of the lens, itself caused by a change in the voltage applied to the lens. At focus setting 1, the lens 30 produces a highly waisted light beam which in turn generates a relatively wide beam at the CCD sensor array 10. By contrast, at focus setting 2, the lens 30 is less curved, resulting in the light beam beyond the lens 30 being more "stretched" with the result that the waist 32 of that light beam moving closer to the position of the CCD sensor array 10 and thus in a beam of smaller width. This change in focus of the lens provides for beam propagation parameter measurement as $M^2$, although beam propagation parameters are not necessarily restricted to just measurement of the beam quality factor ($M^2$).

Figure 7:
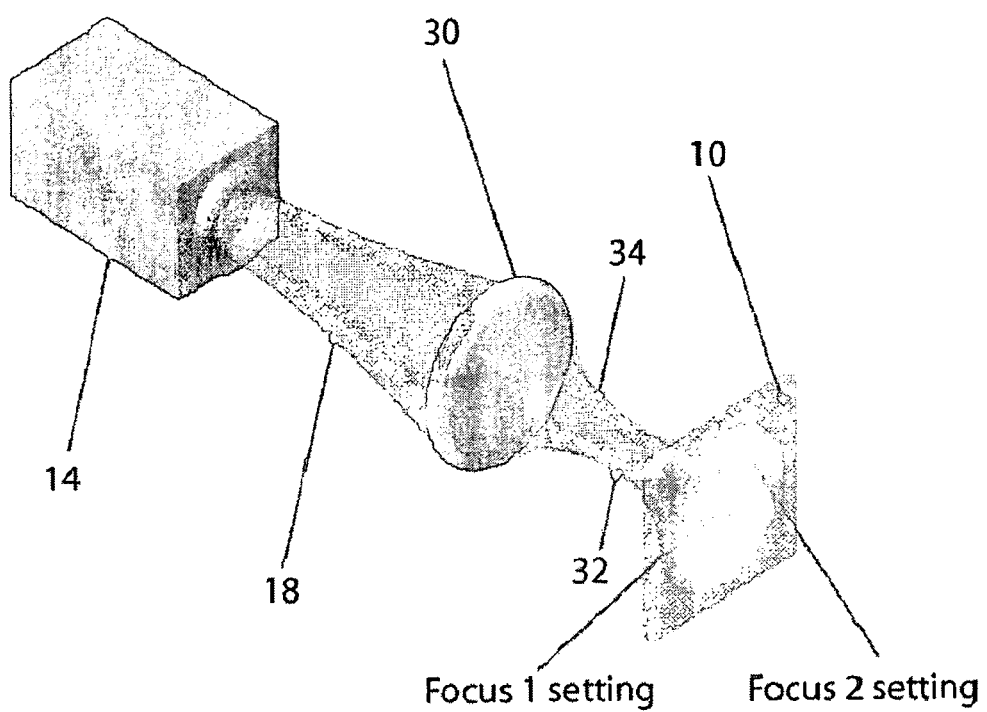
FIG. 7 shows a practical implementation of a system using a liquid lens.

FIG. 7 shows a perspective view in schematic form of the arrangement of FIG. 6 with a light source 14 provided to direct a light beam 18 onto the liquid lens 30, which in turn generates the focused light beam 34 with its artificial waist 32. At the two focus settings shown in this example, the light beam 34 has a different spread across the CCD array 10 with the result that, upon refocusing of the liquid lens 30, the focussed beam 34 can be adjusted so as to produce an artificial waist 32 which will in effect move in position from the liquid lens 30 and through the path of the CCD array 10, thus to provide a variety of measurements at the CCD array 10 in order to allow for the accurate location and determination of that waist 32. It will be appreciated that very small voltage changes can be applied to the lens 30 to produce a substantially greater number of focussed beam samples than is possible with the prior art arrangement shown in FIG. 5, in which the stepper motor 24 can realistically only produce ten or so step movements of the sensor array 10 relative to the focussing lens 16 (or vice versa). Thus, a much larger range of samples of focussed beam 34 is possible and with a mechanism which does not require movement of a liquid lens relative to the CCD array.

Figure 8:
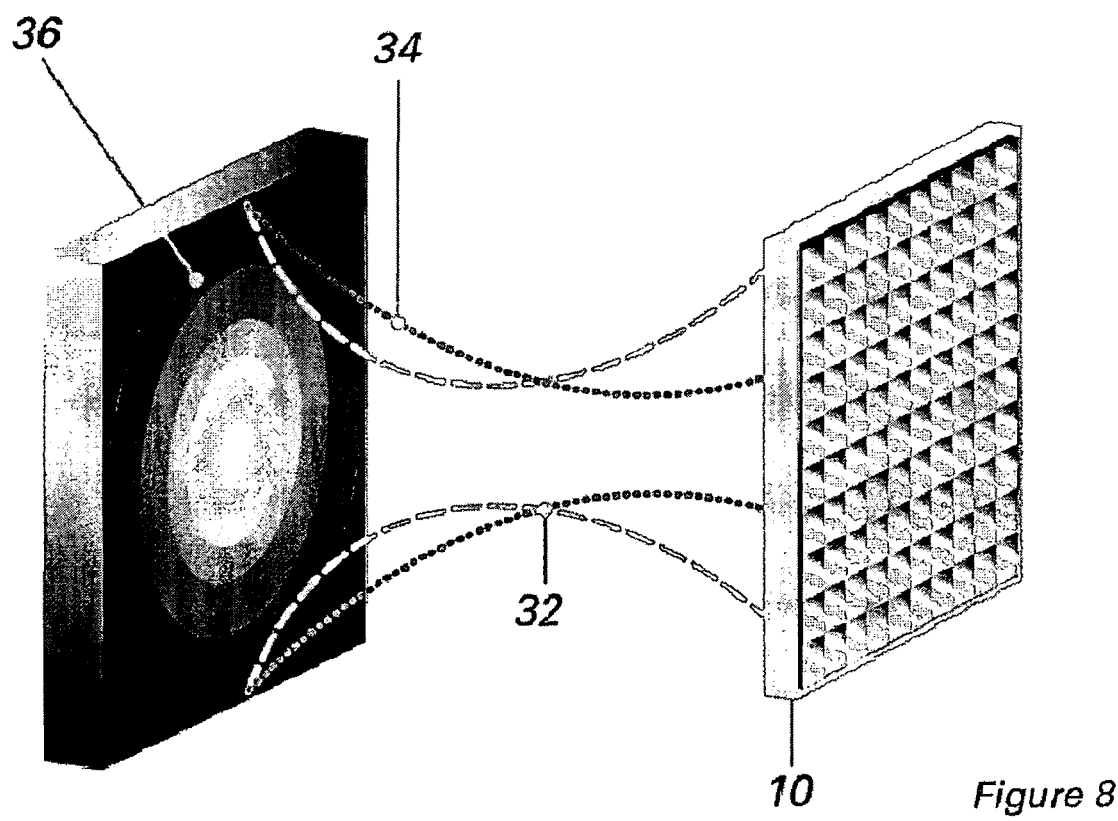
FIG. 8 shows an example of apparatus using a spatial light modulator (liquid crystal) lens.

FIG. 8 shows in schematic form another embodiment, which includes a CCD sensor array 10 as previously described and a liquid crystal Fresnel lens 36. Such lenses are well known in the art. Briefly, such lenses include liquid crystal located between two flat pieces of glass and concentric electrodes located and used for controlling the state of the liquid crystal material between the glass panels. The liquid crystal is controlled by applying a low voltage across the electrodes. Switching on the voltage for a particular electrode alters the effective refractive index of that part of the lens. By turning the concentric electrodes on or off, the focussing power of the lens can be changed from substantially zero to a few dioptres. Liquid crystal lenses of this type can operate in temperatures between −10° C. and +50° C. As the temperature increases, the long focal length of these lenses will decrease. It is thus advantageous to provide either a stabilised temperature with the use of such lenses or calibration based upon the temperature of the lens for calibrating the expected focal length in dependence upon the voltage applied to the concentric electrodes. As liquid crystal Fresnel lenses are known in the art, they are not described herein in further detail.

Figure 4:
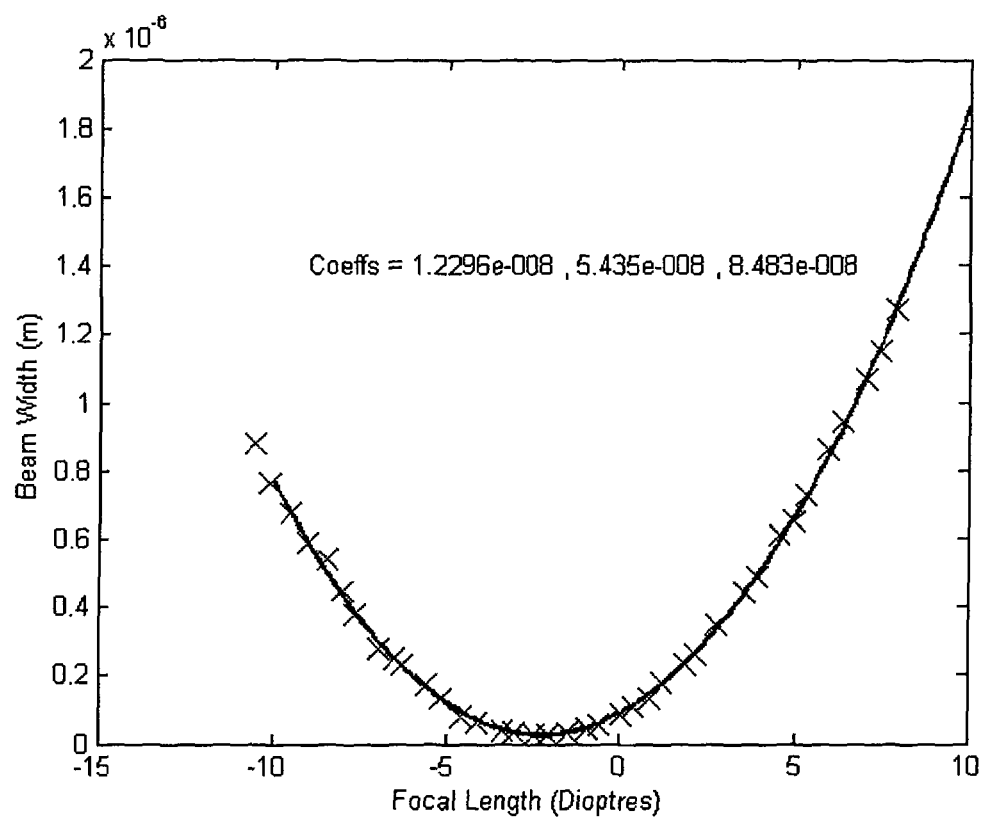
FIG. 4 shows a plot of beam width against the variable focal length of the liquid lens and a hyperbola fit applied to the data points.

As can be appreciated from FIG. 8, by controlling the voltage applied to the electrodes of the liquid crystal lens 36, the focal length of the lens 36 can be varied, thus varying the shape of the beam passing through the lens 36 and thus moving the effective waist 32 which is produced by this beam, thereby to project onto the CCD array 10 different portions of the beam 34 and thus with the purpose of identifying the location and dimensions of the artificial waist 32. This embodiment will operate in an analogous manner to the liquid lens of the embodiment of FIGS. 4 and 5.

Figure 9:
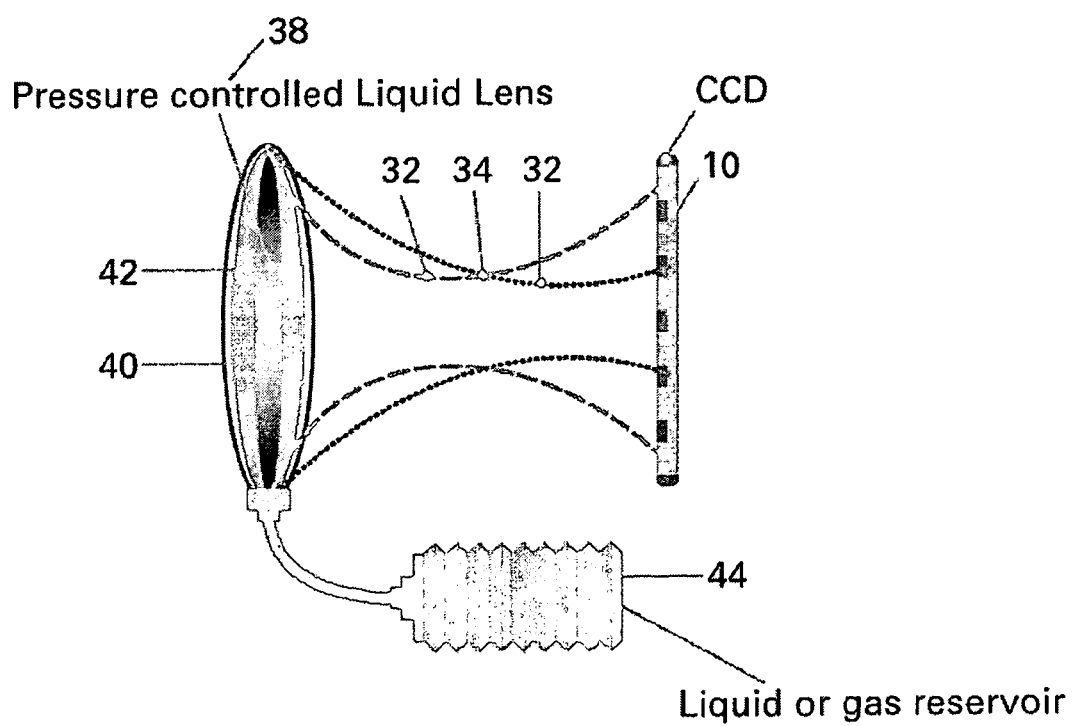
FIG. 9 shows an embodiment of apparatus making use of a pressure controlled liquid lens.

Referring now to FIG. 9, there is shown an embodiment which makes use of a pressure controlled liquid lens 38. The lens may be of a type which consists of a flexible membrane 40 containing a transparent liquid 42. Coupled to the lens 38 is a liquid or gas reservoir 44 and a pumping mechanism for pumping fluid pressure into and out of the liquid lens 38. Inflation of the lens 38 increases the curvature of the transparent flexible membrane 40, which thereby changes the refraction characteristics of the lens. In this manner, the focal length of the lens 38 can be altered so as to generate a varying beam 34 with a moveable artificial waist 32, in a similar manner to the embodiments to FIGS. 6 to 8 above.

A variety of pressure controlled fluidic lenses are known in the art in addition to the example shown in FIG. 9. For instance, Holochip Corporation and Albuquerque, USA, manufactures what it describes as an adaptive polymer lens, which operates by forming a lens from a liquid sealed in the transparent polymer membrane. The application of horizontal pressure to the circumference of the lens varies its focal length.

Figure 10:
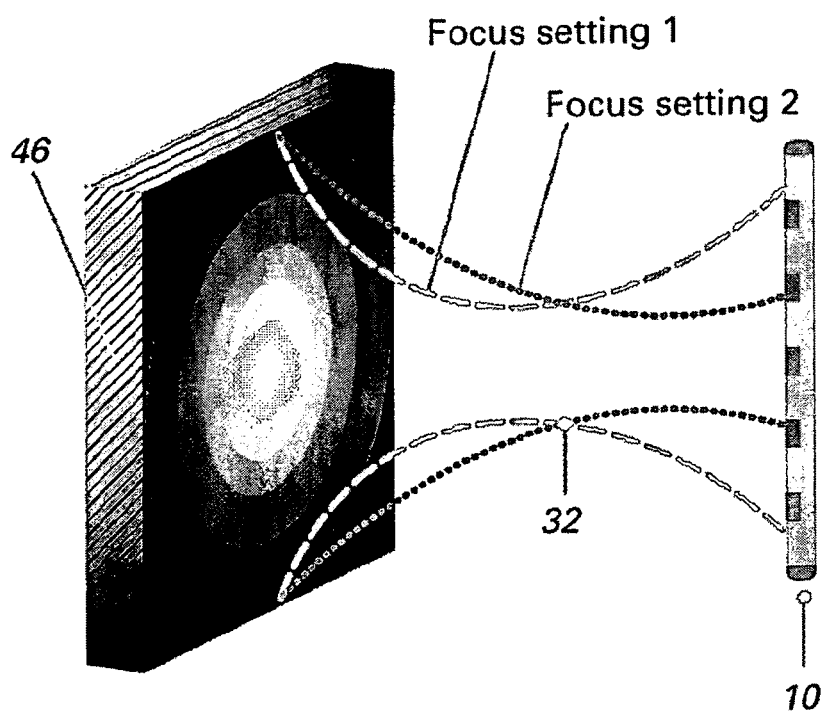
FIG. 10 shows an embodiment of apparatus using an electro-optical variable focus lens.

FIG. 10 shows another embodiment which makes use of an electro-optic variable focus lens 46 able to generate a tunable optical power range, typically between around −129 to +129 dioptres. Such a lens can be achieved by using a combination of two cylindrical electro-optic ferroelectric domain lens stacks in an orthogonal geometry, as described for example by Mahesh Krishnamurthi and colleagues in Applied Physics Letters, Volume 90, Issue 20, id. 201106 (2007) in the article entitled "Two Dimensional Dynamic Focusing of Laser Light by Ferroelectric Domain Based Electro-Optic Lenses"; and by M. J. Kawas and colleagues in the Journal of Lightwave Technology, Volume 15, Issue 9, September 1997, pages 1716-1719 in the article entitled "Electro-optic lens stacks on $LiTaO_3$ by domain inversion". Such lenses are also able to produce a focused beam having an artificial waist in a similar manner to the other embodiments described above.

Figure 11:
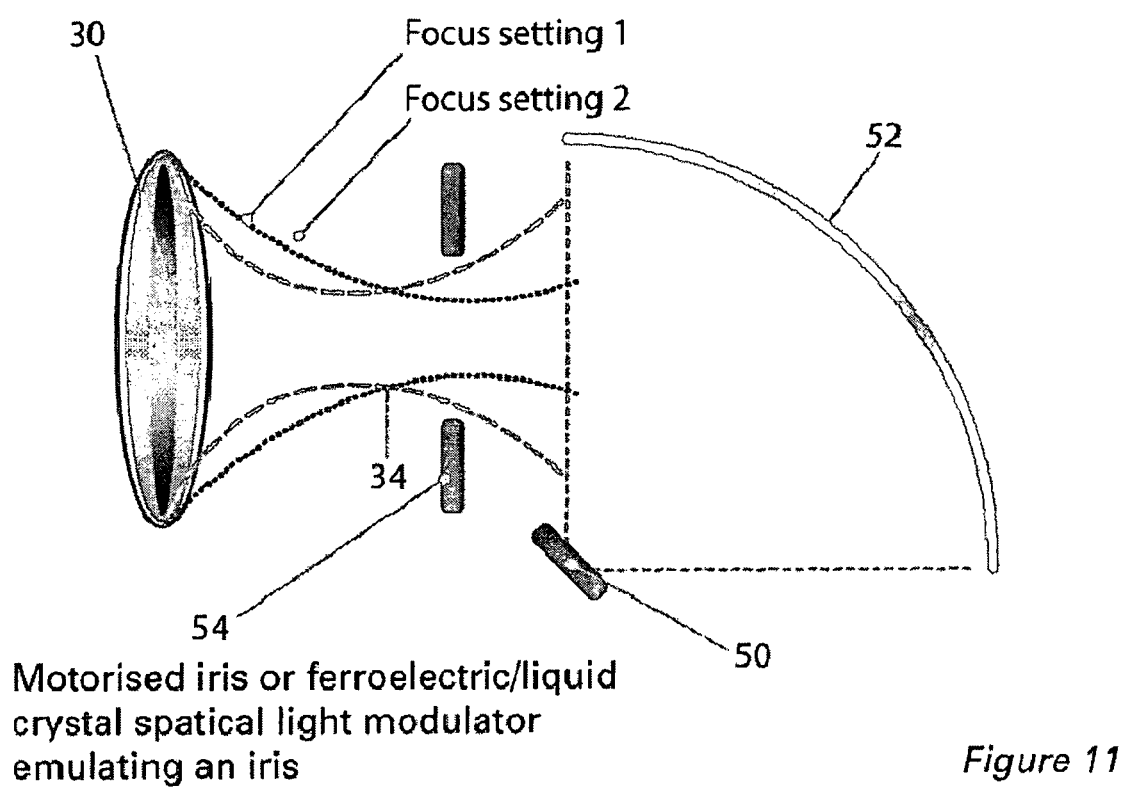
FIG. 11 shows in schematic form an embodiment of apparatus which makes use of a single element detector with a motorised iris or similar device for selecting a part of the light being passing through a variable focused lens.
Figure 12:
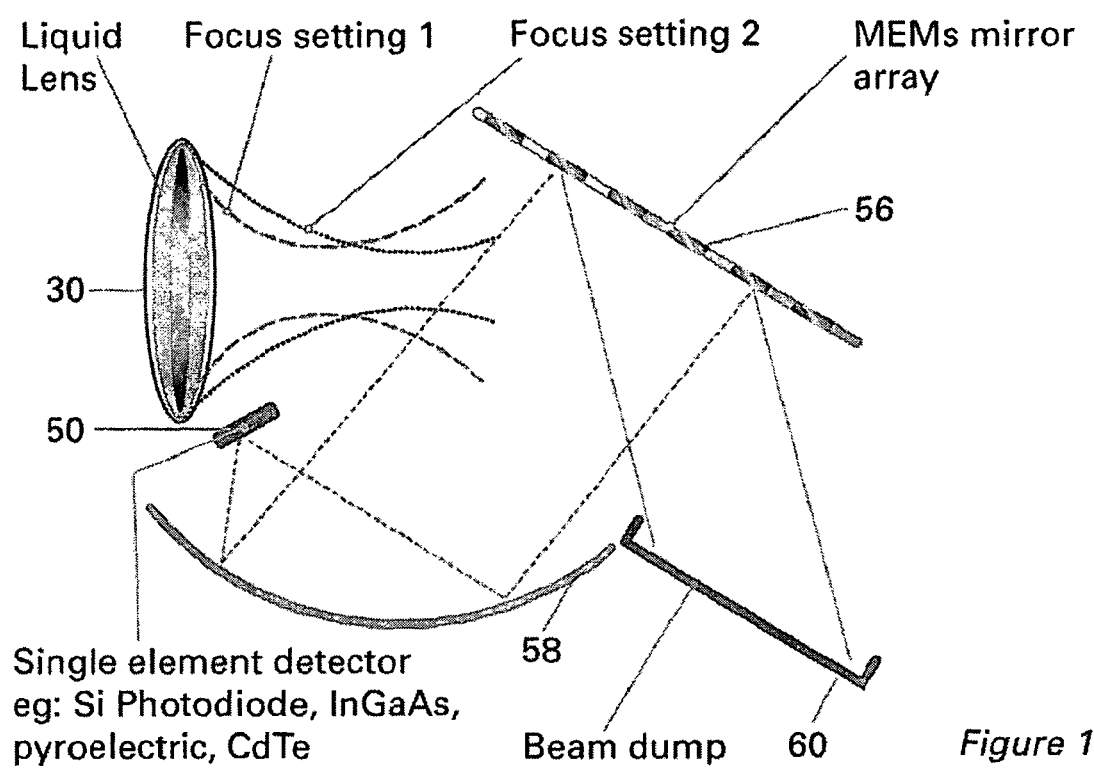
FIG. 12 shows an embodiment of apparatus which includes a single element detector and a moveable mirror array for directing sections of the light beam towards the single element detector.

The above described embodiments make use of a CCD lens array 10 of a type conventional in the art. FIGS. 11 and 12 show the embodiments of apparatus which make use of a single sensor element. This avoids the need for an array detector of the type described above. Array detectors are expensive compared to single element detectors and do not have the same dynamic range and linearity characteristics of most discrete devices. Infra-red array detectors are high cost low resolution devices and are often subject to import controls due to their military applications.

Referring now to FIG. 11, there is shown an example of apparatus which uses a single element detector 50 in place of a CCD array 10 of the type shown in the previously described embodiments. In the embodiment of FIG. 9 a liquid lens 30 is shown, although any of the lenses described above could be used in its place.

The detector element 50 of FIG. 11 could be any suitable high accuracy photodetector, such as a silicon photodiode, an InGaAs, pyroelectric or CdTe photodetector device. The light beam 34 from the lens 30 is reflected onto the detector 50 by means of a concave diffuser or mirror 52 of suitable form, that is which is able to reflect light coming from the lens 30 onto the single element detector 50.

The apparatus includes an adaptable iris element 54 located between the lens 30 and the diffuser or mirror 52 which is designed and operated to select portions of the light beam from the lens 30 to reach the single element detector 50. The adaptable iris 54 may be a motorised iris of the type not dissimilar from the iris of a camera or may be provided by a liquid crystal spatial light modulator arranged to emulate an iris. Such a device could be formed of first and second glass plates with a ferro-electric or liquid crystal located between the plates and provided with electrical terminals able to create variable and moving openings within the iris, thereby to select certain parts of the light beam 34 for passage through the iris 54 and thus to the diffuser or mirror 52 and subsequently to the detector 50. The adaptable iris 54 could have a variable diameter aperture to clip the beam profile propagating through the variable lens. It could alternatively or in addition have a variable aperture location relative to the lens and thus to the beam 34. If the beam 34 is symmetrical, for each focal position of the lens, the aperture/iris 54 is scanned from a small to a large size. The power of the beam passing through the iris/aperture can then be used to find the beam width as described, for example, PD ISO/TR 11146-3:2004 "Lasers and laser-related equipment—Test methods for laser beam widths, divergence angles and beam propagation ratios—Part 3: Intrinsic and geometrical laser beam classification, propagation and details of test methods" and SIEGMAN, A. E. et al., "Choice of clip levels for beam width measurements using knife edge techniques", IEEE Journal of Quantum Electronics Vol. 27 p. 1098-1104 (1991).

It will be appreciated that with a variable diameter iris/aperture, the extremities of the beam 34 would be determined by a tailing off of a change in intensity measured at the detector 50 from the light beam 30 reflecting off and being focused by the concave diffuser or mirror 52 onto the detector 50.

Referring now to FIG. 12, there is shown another embodiment of apparatus which avoids the use of array detectors and instead uses a microelectronic mechanical (MEM) micro mirror array 56, of a type available from Texas Instruments Corporation. This device 56 comprises an array of micromirrors which can be individually controlled to adopt two different orientations which typically have a 20° difference. This mirror array 56 can be used to sample the incoming intensity distribution of the beam 34 by directing some of the light beam into a beam dump 60 (typically an absorbing surface) and directing those parts of the light beam to be sampled to a diffuser or convex mirror 58, which thus reflects and focuses those portions of the light beam to be sampled onto the single detector element 50. By this method, a time result scan of all the pixels and the beam intensity profile can be captured.

Devices of the type shown in FIG. 10 can operate very fast as the mirror response time is typically in the region of tens of microseconds. Thus, a raster or other scan can be completed very rapidly. The lens 30 can be stepped through a range of focal configurations to allow the beam intensity distributions to be obtained in the same way as for an array detector 10. This apparatus allows complex intensity profiles to be measured, as opposed to the iris arrangement shown in FIG. 11.

Figure 13:
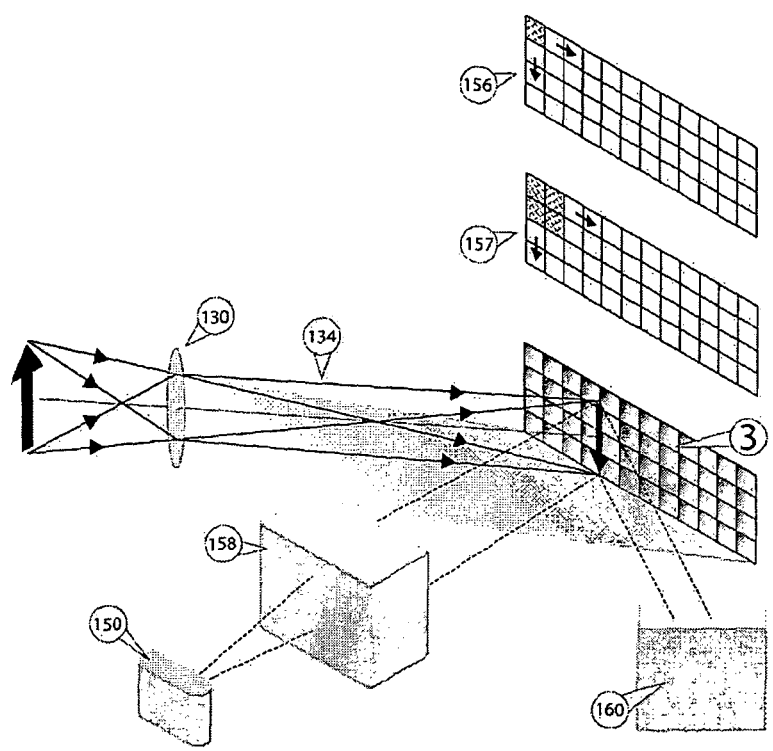
FIG. 13 shows another embodiment of apparatus which includes a single element detector and a moveable mirror array for directing sections of the light beam towards the single element detector.

Referring now to FIG. 13, there is shown another embodiment of apparatus which avoids the use of array detectors and instead uses a microelectronic mechanical (MEM) micro mirror array 156, of a type available from Texas Instruments Corporation. This device 156 comprises an array of micromirrors which can be individually controlled to adopt two different orientations which typically have a 20° difference. This mirror array 156 can be used to sample the incoming intensity distribution of the beam 134 by directing some of the light beam into a beam dump 160 (typically an absorbing surface) and directing those parts of the light beam to be sampled to a diffuser, lens, lens array or concave mirror (optimally an off-axis parabloid) 158, which thus reflects and focuses those portions of the light beam to be sampled onto the single detector element 150. This allows a wide spectral coverage. Several single element detectors with differing spectral coverage could be placed within the focal spot of the focussing element or near the diffuser 158 to allow the device to provide a wide ranging spectral capability. This apparatus can be also used as a spectrally insensitive imaging device as an alternative to imaging arrays such as Charge Coupled Devices (CCD) or GaAs arrays for Infra Red light imaging. The mirror array 156 can be used for a very wide range of wavelengths and so the detection capability is then dictated by the single element detector 150. These single element detectors 150 can be made to be sensitive to wavelength sections from the UV to the far Infra red. By this method, a time resolved scan of all the pixels and the beam intensity profile, or image of an object, can be captured.

The devices shown in FIG. 13 can operate very fast as the mirror response time is typically in the region of tens of microseconds. Thus, a raster or other scan can be completed very rapidly. The other advantage of this system is that if light levels are low, blocks of pixels 157 can be scanned by appropriate positioning of a block of mirror elements 157, instead of orienting a single mirror element 156. This directs more light at the detector 150 and also allows a faster scan speed across the whole of the array 156. The resulting lower resolution image can be improved by reverting to single mirror element scans. This can also be localized to areas of interest within the image. Moreover, if it is known that the object or light beam to be scanned has elements of symmetry, the scan pattern can be changed to take advantage of this. The converging second moment width measurement regime can be implemented using the array pixels 157. Initially a low resolution measurement is done to identify the area of the beam which produces the highest power on the detector. Concentric circles (or other shape) of mirror array elements are activated sequentially around this point to generate a basic image. This can then be iteratively improved with raster scanning. If stray light or other light noise effects are a problem the beam dump can be replaced with a second optical element and single element detector which can be used with the first single element detector to facilitate differential detection.

As with the embodiment of FIG. 12, the lens 130 can be stepped through a range of focal configurations to allow the beam intensity distributions to be obtained in the same way as for an array detector. This apparatus allows complex intensity profiles to be measured.

The disclosures in British patent application number 0907290.1, from which this application claims priority, and in the abstract accompanying this application are incorporated herein by reference.

The invention claimed is:

1. A system for obtaining a propagation factor for determining the performance of a light beam including a light sensor element, a lens element operable to focus a beam from a light source to be tested towards the sensor element, the sensor element and lens element being substantially fixed in position relative to one another; wherein the lens element is a variable focus lens, the lens being adjustable so as to adjust the focal length thereof to provide to the sensor element a varying focused light beam at and either side of a waist thereof, thereby to allow the determination of a beam waist and propagation factor of the light beam and therefrom the performance of the light beam.

2. A system according to claim 1, wherein the variable focus lens is adjustable by means of an electrical stimulus.

3. A system according to claim 1, wherein the lens is an electrowetting liquid lens.

4. A system according to claim 1, wherein the lens is a liquid crystal lens.

5. A system according to claim 1, wherein the lens is a pressure controlled fluidic lens.

6. A system according to claim 1, wherein the lens is an electro-optic variable focus lens.

7. A system according to claim 1, wherein the sensor element includes an array of sensors.

8. A system according to claim 7, wherein the sensor element is a CCD array.

9. A system according to claim 1, wherein the sensor element includes a single element detector.

10. A system according to claim 9, wherein the single element detector is a silicon photodiode, an InGaAs, a pyroelectric or CdTe detector element.

11. A system according to claim 9, including a selection and/or directing device for directing light to the single element detector.

12. A system according to claim 9, including a motorised iris.

13. A system according to claim 9, including a moveable mirror array.

14. A method of determining the characteristics of a light beam, including the steps of providing a sensor element, providing a variable focus lens element, the sensor element and lens element being substantially fixed in position relative to one another, directing a beam to be quantified at the lens element, during a measuring step varying the focus of the lens element to provide to the sensor element a varying focused light beam at and either side of a waist of the light beam, obtaining therefrom the beam waist and the propagation factor of the light beam and determining from said obtaining step the performance of the light beam.

* * * * *